(12) United States Patent
Maddaleno et al.

(10) Patent No.: US 11,692,457 B2
(45) Date of Patent: Jul. 4, 2023

(54) SYSTEM AND METHOD FOR ROTOR OVERSPEED MITIGATION

(71) Applicants: General Electric Company, Schenectady, NY (US); GE Avio S.r.l., Rivalta di Torino (IT)

(72) Inventors: Roberto Maddaleno, Lanzo Torinese (IT); Antonio Giuseppe D'Ettole, Rivoli (IT); Matteo Renato Usseglio, Turin (IT); Alessandra Torri, Turin (IT); Darek Tomasz Zatorski, Fort Wright, KY (US)

(73) Assignees: General Electric Company, Schenectady, NY (US); GE Avio S.r.l., Turin (IT)

( * ) Notice: Subject to any disclaimer, the term of this patent is extended or adjusted under 35 U.S.C. 154(b) by 0 days.

(21) Appl. No.: 17/471,621

(22) Filed: Sep. 10, 2021

(65) Prior Publication Data

US 2022/0162961 A1    May 26, 2022

(30) Foreign Application Priority Data

Nov. 26, 2020    (IT) .......................... 102020000028520

(51) Int. Cl.
*F01D 21/02*    (2006.01)
*F01D 21/00*    (2006.01)

(52) U.S. Cl.
CPC .......... *F01D 21/02* (2013.01); *F01D 21/003* (2013.01); *F05D 2260/40311* (2013.01); *F05D 2260/902* (2013.01); *F05D 2270/021* (2013.01); *F05D 2270/304* (2013.01)

(58) Field of Classification Search
CPC ...... F01D 17/06; F01D 21/003; F01D 21/006; F01D 21/02; F01D 21/04; F01D 5/02; F05D 2260/4031; F05D 2260/40311; F05D 2260/80; F05D 2260/90; F05D 2260/902; F05D 2270/021; F05D 2270/09; F05D 2270/304; F02C 3/067; F02C 3/107; F02C 3/113; F02C 7/36; F02C 9/00; F02K 3/04;
(Continued)

(56) References Cited

U.S. PATENT DOCUMENTS 5,010,729 A * 4/1991 Adamson ................ F02C 3/067
                                                           416/129
5,622,045 A    4/1997 Weimer et al.
6,494,046 B1  12/2002 Hayess
(Continued)

*Primary Examiner* — Loren C Edwards
(74) *Attorney, Agent, or Firm* — Dority & Manning, P.A.

(57) ABSTRACT

A turbomachine, a computing system for a turbomachine, and a method for overspeed protection are provided. The turbomachine includes a first rotor assembly interdigitated with a second rotor assembly together operably coupled to a gear assembly. A plurality of sensors is configured to receive rotor state data indicative of one or more of a speed, geometric dimension, or capacitance, or change thereof, or rate of change thereof, relative to the first rotor assembly or the second rotor assembly. A controller executes operations including receiving rotor state data from the plurality of sensors; comparing rotor state data to one or more rotor state limits; and contacting one or more of the first rotor assembly or the second rotor assembly to a contact surface adjacent to the respective first rotor assembly or the second rotor assembly if the rotor state data exceeds the rotor state limit.

9 Claims, 7 Drawing Sheets

(58) Field of Classification Search
CPC .......... F02K 3/06; F02K 3/062; G01M 15/14; F04D 19/002
See application file for complete search history.

(56) References Cited

U.S. PATENT DOCUMENTS

| | | |
|---|---|---|
| 7,002,172 B2 | 2/2006 | Rensch |
| 7,100,354 B2 | 9/2006 | Opper |
| 7,934,367 B2 | 5/2011 | Mons |
| 8,313,279 B2 | 11/2012 | Mollmann |
| 9,051,044 B2 | 6/2015 | Talasco et al. |
| 9,982,607 B2 | 5/2018 | Argote et al. |
| 10,167,784 B2 | 1/2019 | Dooley |
| 10,190,440 B2 | 1/2019 | Argote et al. |
| 2016/0090918 A1 | 3/2016 | Certain |
| 2016/0123180 A1* | 5/2016 | Otto ................... F01D 21/003 60/226.1 |
| 2017/0254295 A1 | 9/2017 | Moster et al. |
| 2017/0356302 A1* | 12/2017 | Descamps ............... F02C 7/262 |
| 2018/0051585 A1 | 2/2018 | Xiong et al. |
| 2019/0085721 A1 | 3/2019 | Pankaj et al. |
| 2019/0277156 A1 | 9/2019 | Negri et al. |
| 2020/0003157 A1 | 1/2020 | Clements et al. |
| 2020/0088112 A1 | 3/2020 | Tang |
| 2020/0149542 A1 | 5/2020 | Tan-Kim et al. |
| 2020/0200037 A1 | 6/2020 | Brown et al. |

* cited by examiner

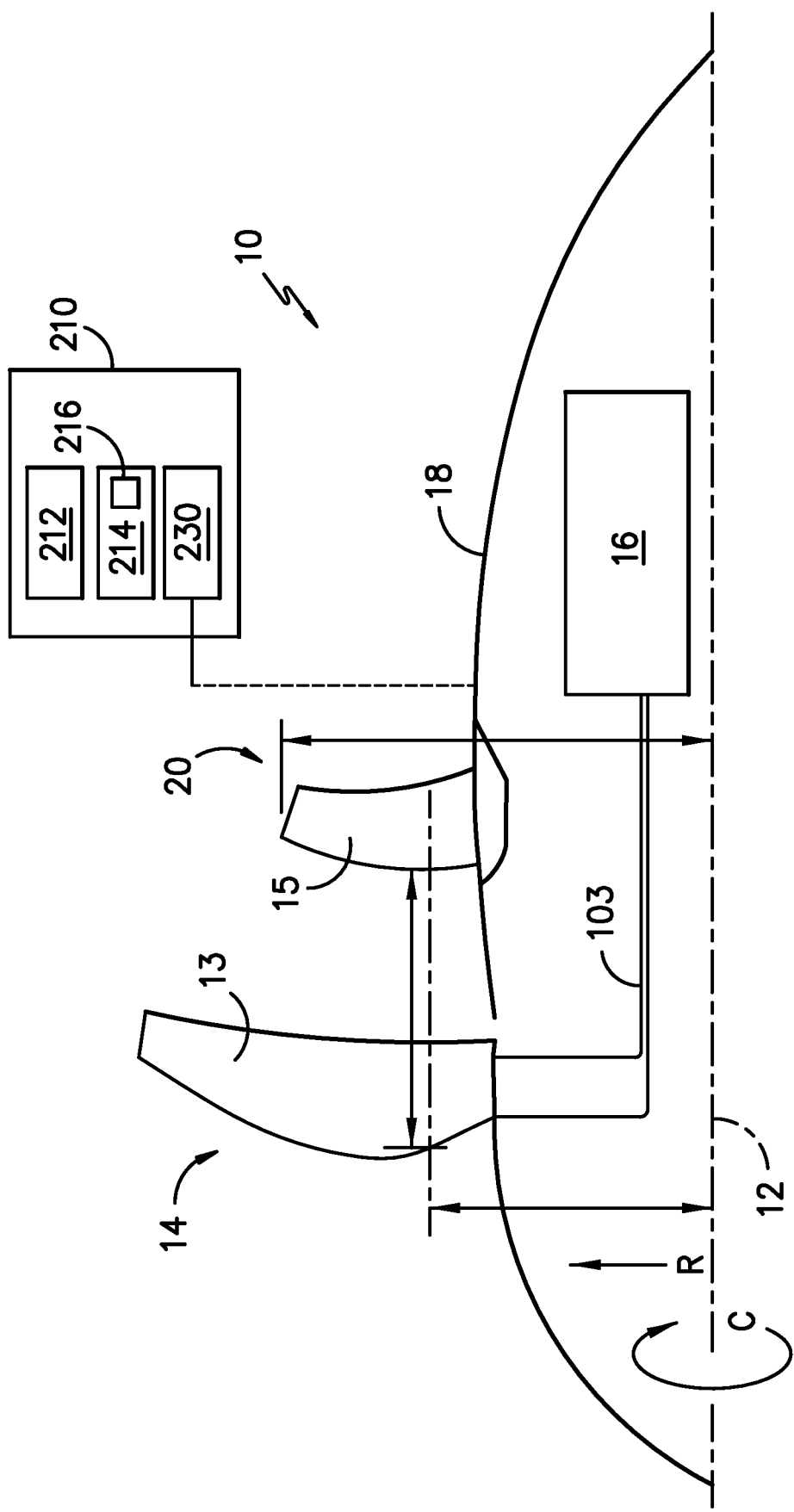
FIG. -1-

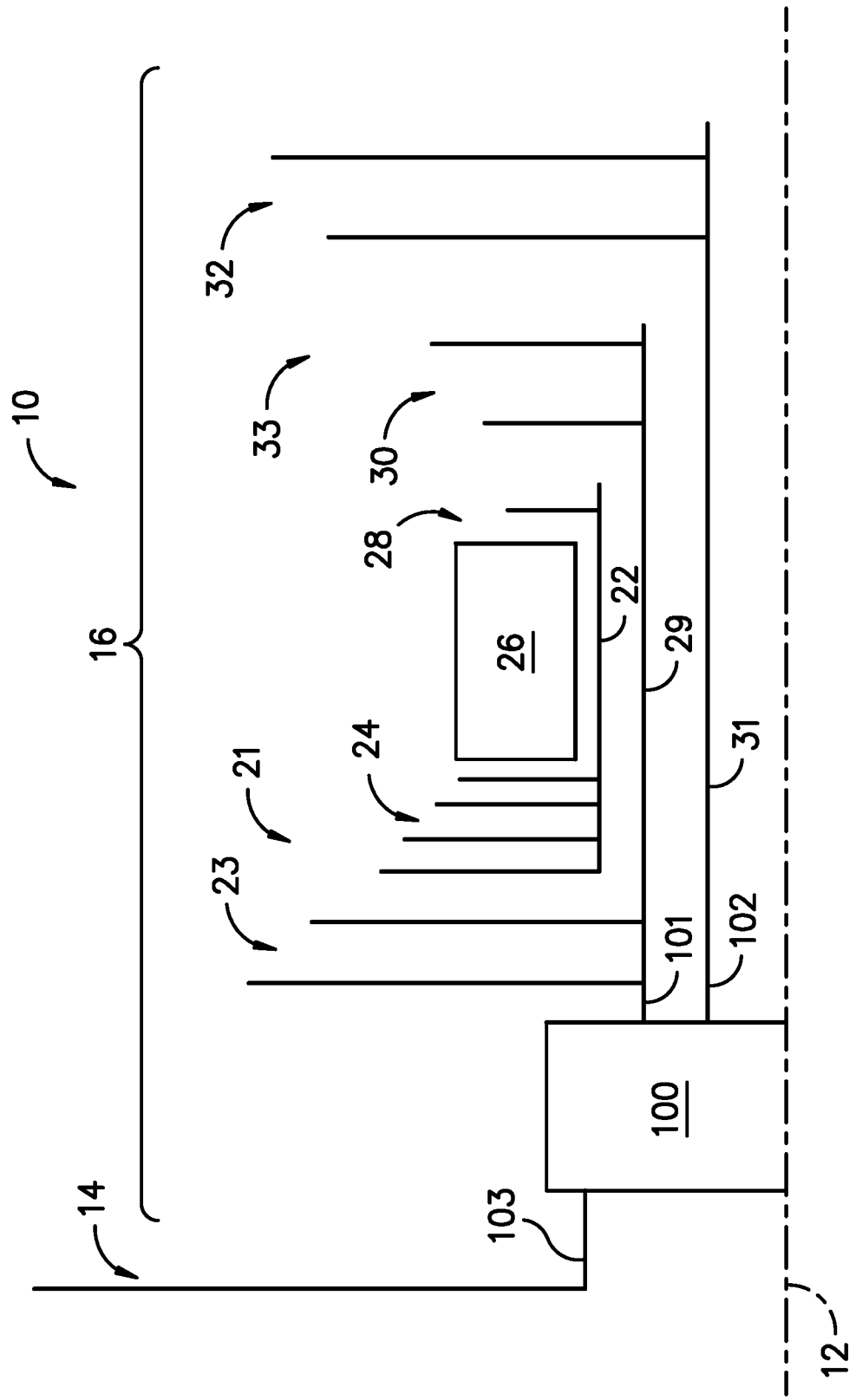
FIG. -2-

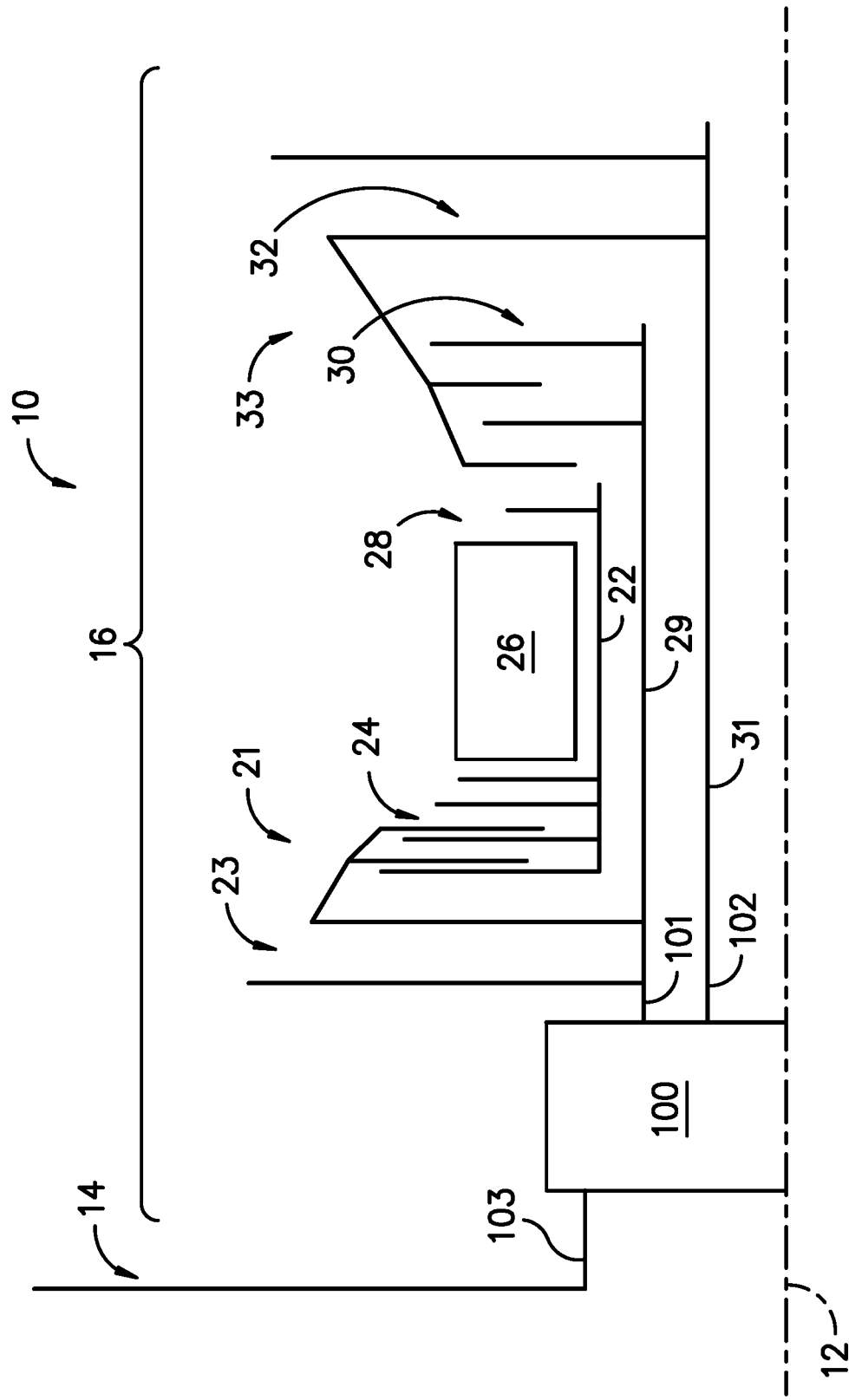
FIG. -3-

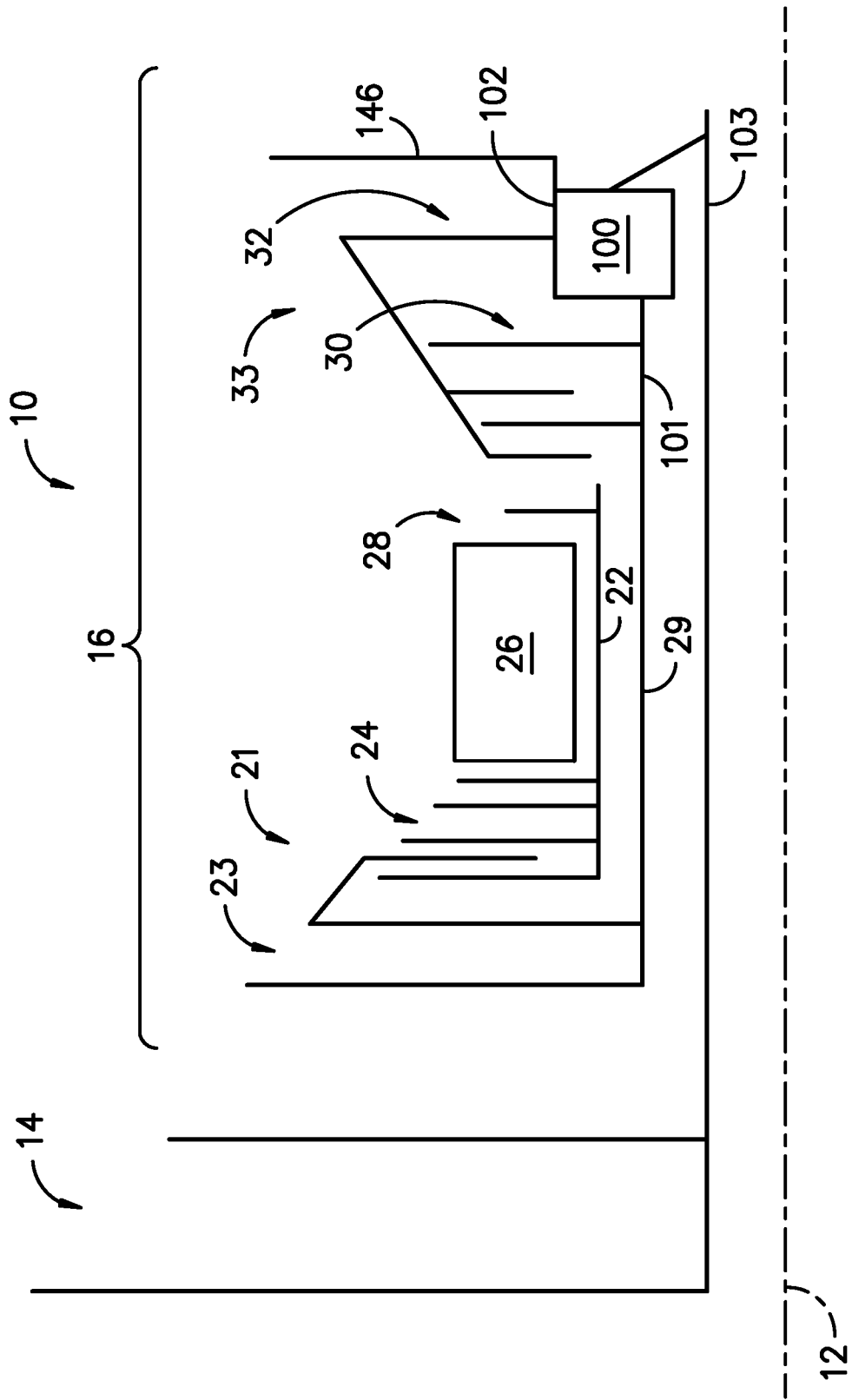
FIG. -4-

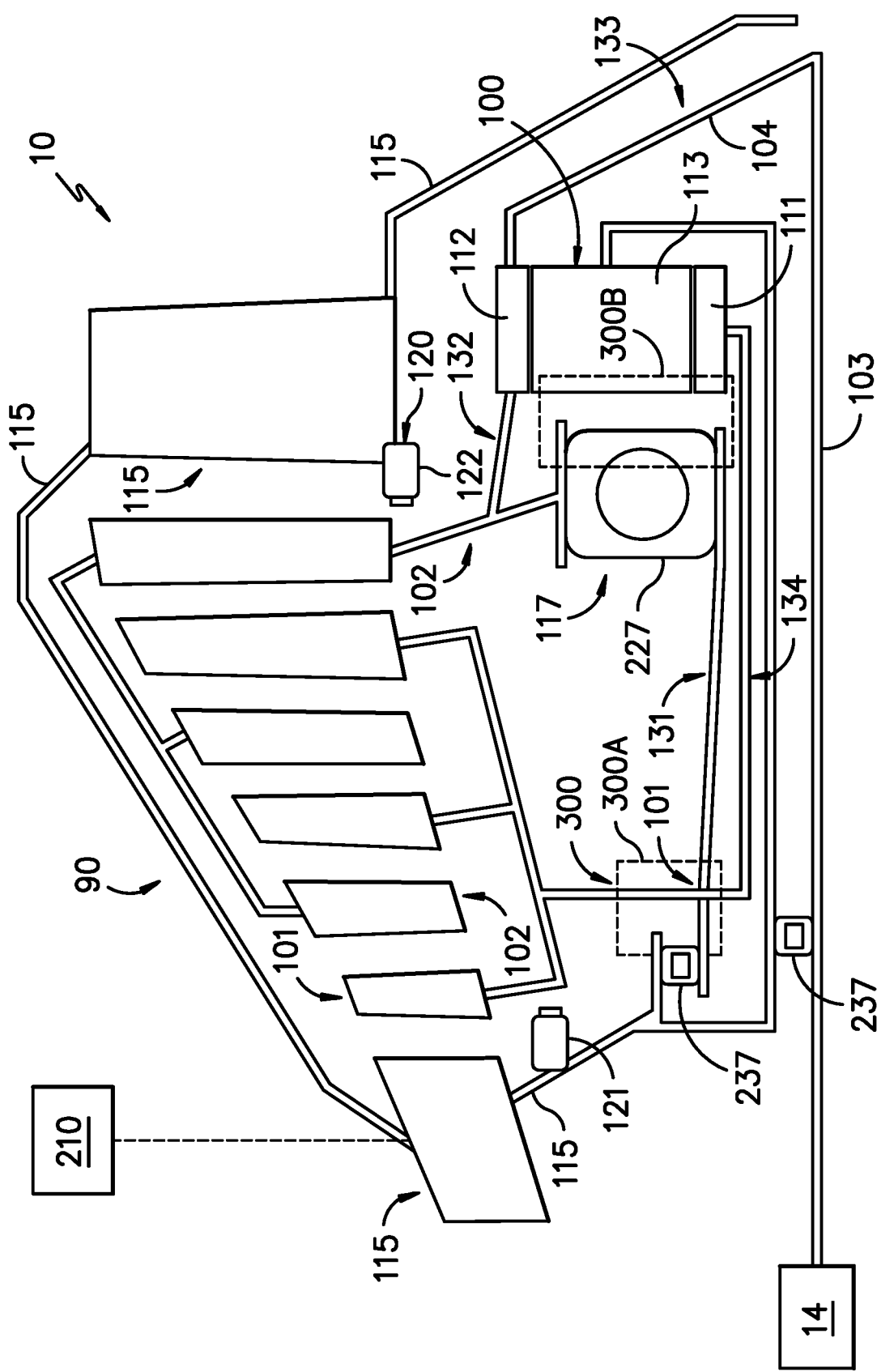
FIG. -5-

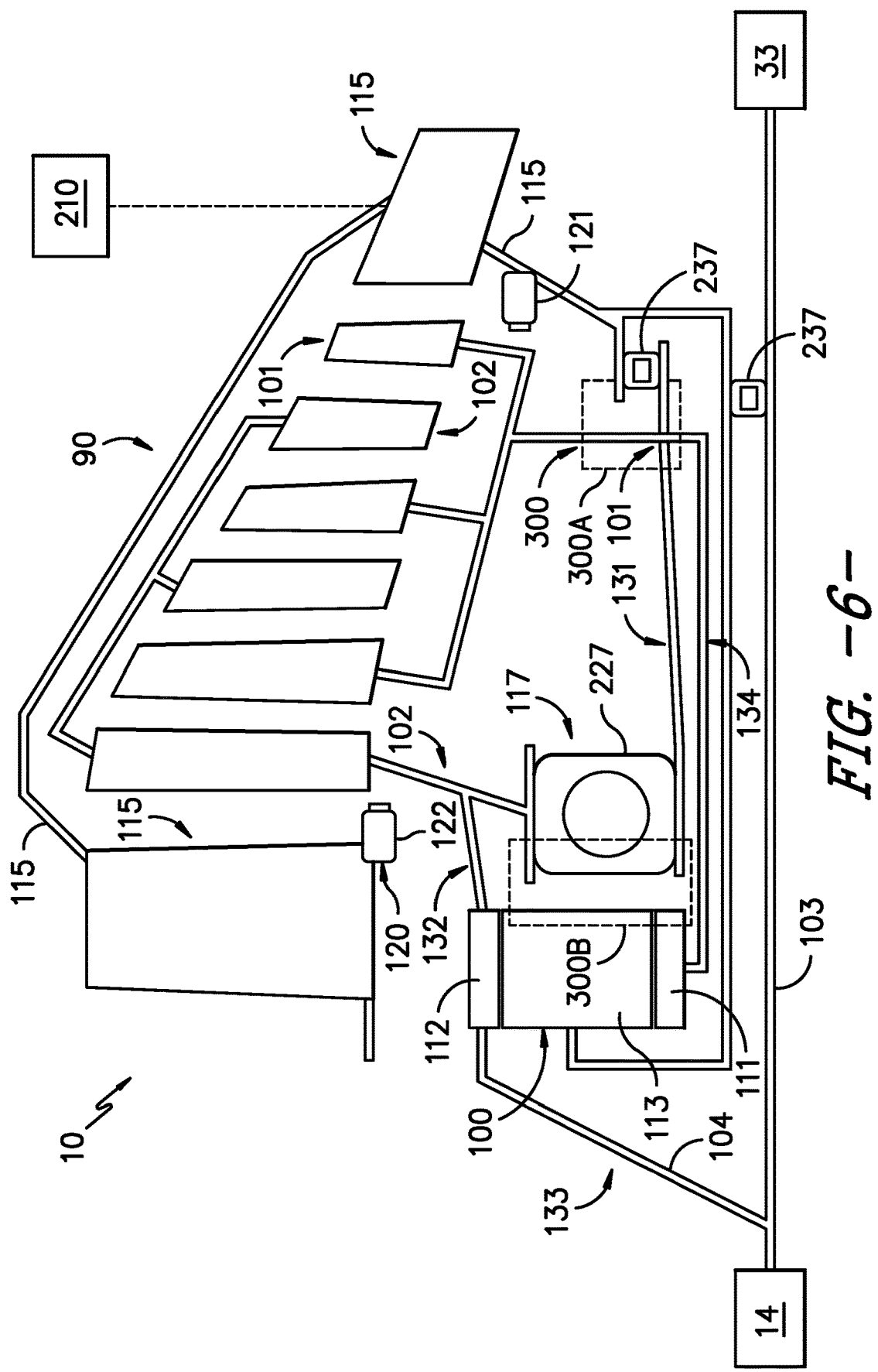

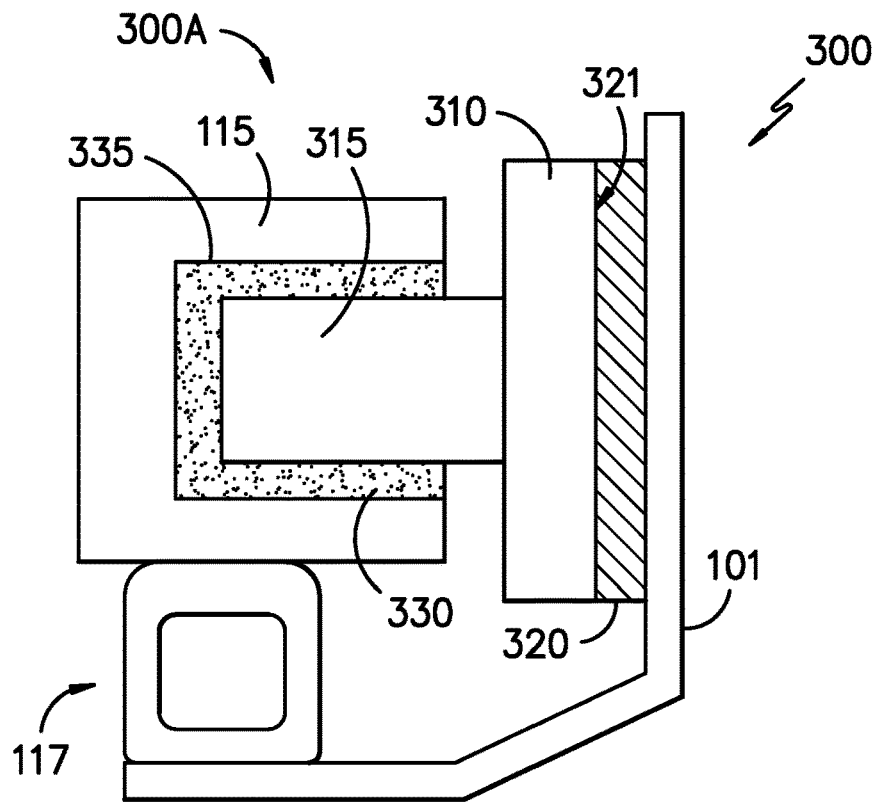
FIG. -7-
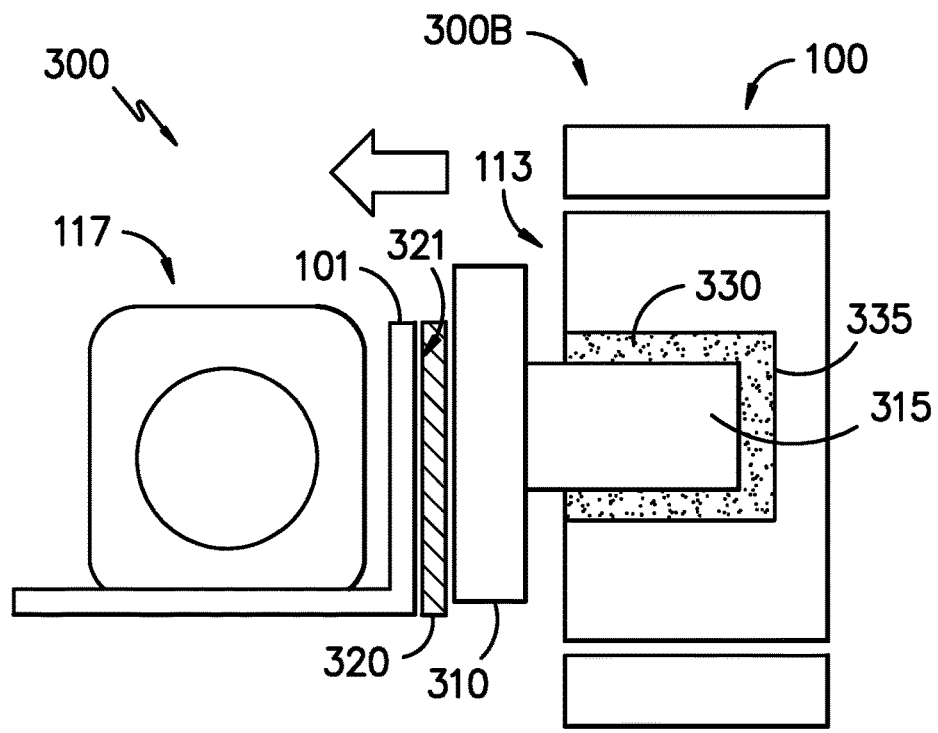
FIG. -8-

SYSTEM AND METHOD FOR ROTOR OVERSPEED MITIGATION

PRIORITY INFORMATION

The present application claims priority to Italian Patent Application Number 102020000028520 filed on Nov. 26, 2020.

FIELD

The present subject matter relates generally to gear assemblies for turbine engines.

BACKGROUND

Turbine engines may include stages of counter-rotating rotors adjacent to one another. Failures for counter-rotating turbines differ significantly from conventional turbine engines with sequential rotor-stator stages, such as due to concentric or interdigitated rotor architectures, or the proximity of separately rotatable structures from one another. There is a need for systems and methods for determining whether a component of a counter-rotating rotor has failed, or the extent of damage to the rotor or surrounding engine. Furthermore, there is a need for systems and methods for operating the engine in accordance with a failure.

BRIEF DESCRIPTION

Aspects and advantages of the invention will be set forth in part in the following description, or may be obvious from the description, or may be learned through practice of the invention.

An aspect of the present disclosure is directed to a turbomachine including a first rotor assembly interdigitated with a second rotor assembly is provided. The first rotor assembly and the second rotor assembly are operably coupled to a gear assembly. The first rotor assembly is rotatable at a first rotor speed different from a second rotor speed at which the second rotor assembly is rotatable, the first rotor speed proportional to the second rotor speed via the gear assembly. A plurality of sensors is configured to receive rotor state data indicative of one or more of a speed, geometric dimension, or capacitance, or change thereof, or rate of change thereof, relative to the first rotor assembly or the second rotor assembly. The plurality of sensors is configured to provide the rotor state data to a controller. The controller is configured to execute operations, the operations including receiving rotor state data from the plurality of sensors; comparing rotor state data to one or more rotor state limits; and contacting one or more of the first rotor assembly or the second rotor assembly to a contact surface adjacent to the respective first rotor assembly or the second rotor assembly if the rotor state data exceeds the rotor state limit. Contacting one or more of the first rotor assembly or the second rotor assembly to the contact surface places rotor state data within the rotor state limit.

Another aspect of the present disclosure is directed to a computing system for a turbomachine including a first rotor assembly is interdigitated with a second rotor assembly. The first rotor assembly and the second rotor assembly are operably coupled to a gear assembly. A fan assembly is operably coupled to receive power from the gear assembly. The computing system is configured to execute operations. The operations include receiving rotor state data from a plurality of sensors positioned to receive rotor state data from the first rotor assembly and the second rotor assembly; comparing rotor state data to one or more rotor state limits; determining whether one or more of the first rotor assembly, the second rotor assembly, or the fan assembly is disconnected from the gear assembly; and generating a control signal if the rotor state data exceeds the rotor state limit.

Yet another aspect of the present disclosure is directed to a method for overspeed protection for a turbomachine including a first rotor assembly interdigitated with a second rotor assembly operably coupled together to a gear assembly. The first rotor assembly is rotatable at a first rotor speed different from a second rotor speed at which the second rotor assembly is rotatable, the first rotor speed proportional to the second rotor speed via the gear assembly. A plurality of sensors is configured to receive rotor state data indicative of one or more of a speed, geometric dimension, or capacitance, or change thereof, or rate of change thereof, relative to the first rotor assembly or the second rotor assembly. The plurality of sensors is configured to provide the rotor state data to a controller. The method includes receiving rotor state data from the plurality of sensors; comparing rotor state data to one or more rotor state limits; and contacting one or more of the first rotor assembly or the second rotor assembly to a contact surface adjacent to the respective first rotor assembly or the second rotor assembly if the rotor state data exceeds the rotor state limit. Contacting one or more of the first rotor assembly or the second rotor assembly to the contact surface places rotor state data within the rotor state limit.

Still another aspect of the present disclosure is directed to a method for operating a turbomachine including a first rotor assembly interdigitated with a second rotor assembly. The first rotor assembly and the second rotor assembly are operably coupled to a gear assembly. A fan assembly is operably coupled to receive power from the gear assembly. The method includes receiving rotor state data from a plurality of sensors positioned to receive rotor state data from the first rotor assembly and the second rotor assembly; comparing rotor state data to one or more rotor state limits; determining whether one or more of the first rotor assembly, the second rotor assembly, or the fan assembly is disconnected from the gear assembly; and generating a control signal if the rotor state data exceeds the rotor state limit.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a cutaway side view of an exemplary embodiment of a turbomachine engine including a core engine with a gear assembly according to an aspect of the present disclosure;

FIG. 2 is an exemplary schematic embodiment of the engine of FIG. 1 according to an aspect of the present disclosure;

FIG. 3 is an exemplary schematic embodiment of the engine of FIG. 1 according to an aspect of the present disclosure;

FIG. 4 is an exemplary schematic embodiment of the engine of FIG. 1 according to an aspect the present disclosure;

FIG. 5 is an exemplary embodiment of a rotor assembly and gear assembly of the engine of FIG. 4 according to aspects of the present disclosure;

FIG. 6 is an exemplary embodiment of a rotor assembly and gear assembly of the engine of FIGS. 2-3 according to aspects of the present disclosure;

FIG. 7 is an exemplary embodiment of a braking system at the rotor assembly of FIGS. 5-6; and FIG. 8 is an exemplary embodiment of a braking system at the rotor assembly of FIGS. 5-6.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

One or more components of the turbomachine engine or gear assembly described herein below may be manufactured or formed using any suitable process, such as an additive manufacturing process, such as a 3-D printing process. The use of such a process may allow such component to be formed integrally, as a single monolithic component, or as any suitable number of sub-components. In particular, the additive manufacturing process may allow such component to be integrally formed and include a variety of features not possible when using prior manufacturing methods. For example, the additive manufacturing methods described herein may allow for the manufacture of gears, housings, conduits, heat exchangers, or other gear assembly components having unique features, configurations, thicknesses, materials, densities, fluid passageways, headers, and mounting structures that may not have been possible or practical using prior manufacturing methods. Some of these features are described herein.

Suitable additive manufacturing techniques in accordance with the present disclosure include, for example, Fused Deposition Modeling (FDM), Selective Laser Sintering (SLS), 3D printing such as by inkjets, laser jets, and binder jets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

Referring now to the drawings, FIG. 1 is an exemplary embodiment of an engine 10 including a gear assembly according to aspects of the present disclosure. The engine 10 includes a fan assembly 14 driven by a core engine 16. In various embodiments, the core engine 16 is a Brayton cycle system configured to drive the fan assembly 14. The core engine 16 is shrouded, at least in part, by an outer casing 18. The fan assembly 14 includes a plurality of fan blades 13. A vane assembly 20 is extended from the outer casing 18. The vane assembly 20 including a plurality of vanes 15 is positioned in operable arrangement with the fan blades 13 to provide thrust, control thrust vector, abate or re-direct undesired acoustic noise, or otherwise desirably alter a flow of air relative to the fan blades 13. In some embodiments, the fan assembly 14 includes between three (3) and twenty (20) fan blades 13. In certain embodiments, the vane assembly 20 includes an equal or fewer quantity of vanes 15 to fan blades 13.

In certain embodiments, such as depicted in FIG. 1, the vane assembly 20 is positioned downstream or aft of the fan assembly 14. However, it should be appreciated that in some embodiments, the vane assembly 20 may be positioned upstream or forward of the fan assembly 14. In still various embodiments, the engine 10 may include a first vane assembly positioned forward of the fan assembly 14 and a second vane assembly positioned aft of the fan assembly 14. The fan assembly 14 may be configured to desirably adjust pitch at one or more fan blades 13, such as to control thrust vector, abate or re-direct noise, or alter thrust output. The vane assembly 20 may be configured to desirably adjust pitch at one or more vanes 15, such as to control thrust vector, abate or re-direct noise, or alter thrust output. Pitch control mechanisms at one or both of the fan assembly 14 or the vane assembly 20 may co-operate to produce one or more desired effects described above.

In certain embodiments, such as depicted in FIG. 1, the engine 10 is an un-ducted thrust producing system, such that the plurality of fan blades 13 is unshrouded by a nacelle or fan casing. As such, in various embodiments, the engine 10 may be configured as an unshrouded turbofan engine, an open rotor engine, or a propfan engine. In particular embodiments, the engine 10 is a single unducted rotor engine including a single row of fan blades 13. The engine 10 configured as an open rotor engine includes the fan assembly 14 having large-diameter fan blades 13, such as may be suitable for high bypass ratios, high cruise speeds (e.g., comparable to aircraft with turbofan engines, or generally higher cruise speed than aircraft with turboprop engines), high cruise altitude (e.g., comparable to aircraft with turbofan engines, or generally high cruise speed than aircraft with turboprop engines), and/or relatively low rotational speeds. Cruise altitude is generally an altitude at which an aircraft levels after climb and prior to descending to an approach flight phase. In various embodiments, the engine is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degree Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

Referring now to FIGS. 2-4, exemplary embodiments of the core engine 16 are provided. The core engine 16 includes a compressor section 21, a heat addition system 26, and an expansion section 33 together in serial flow arrangement. The core engine 16 is extended circumferentially relative to an engine centerline axis 12. The core engine 16 includes a high-speed spool that includes a high-speed compressor 24 and a high-speed turbine 28 operably rotatably coupled together by a high-speed shaft 22. The heat addition system 26 is positioned between the high-speed compressor 24 and the high-speed turbine 28. Various embodiments of the heat addition system 26 include a combustion section. The combustion section may be configured as a deflagrative combustion section, a rotating detonation combustion section, a pulse detonation combustion section, or other appropriate heat addition system. The heat addition system 26 may be configured as one or more of a rich-burn system or a lean-burn system, or combinations thereof. In still various embodiments, the heat addition system 26 includes an annular combustor, a can combustor, a cannular combustor, a trapped vortex combustor (TVC), or other appropriate combustion system, or combinations thereof.

Referring still to FIGS. 2-4, the core engine 16 includes a booster or low-speed compressor 23 positioned in flow relationship with the high-speed compressor 24. The low-speed compressor 23 is rotatably coupled with a first turbine 30 via a first shaft 29. Various embodiments of the expansion section 33 further include a second turbine 32 rotatably coupled to a second shaft 31. The first turbine 30 and the second turbine 32 are each operably connected to a gear assembly 100 to provide power to the fan assembly 14, such as described further herein. In various embodiments, the rotors are coupled to the fan assembly 14 via a driveshaft 103 extended from the gear assembly 100.

It should be appreciated that the terms "low" and "high", or their respective comparative degrees (e.g., -er, where applicable), when used with compressor, turbine, shaft, or spool components, each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine. Alternatively, unless otherwise specified, the aforementioned terms may be understood in their superlative degree. For example, a "low turbine" or "low speed turbine" may refer to the lowest maximum rotational speed turbine within a turbine section, a "low compressor" or "low speed compressor" may refer to the lowest maximum rotational speed turbine within a compressor section, a "high turbine" or "high speed turbine" may refer to the highest maximum rotational speed turbine within the turbine section, and a "high compressor" or "high speed compressor" may refer to the highest maximum rotational speed compressor within the compressor section. Similarly, the low speed spool refers to a lower maximum rotational speed than the high speed spool. It should further be appreciated that the terms "low" or "high" in such aforementioned regards may additionally, or alternatively, be understood as relative to minimum allowable speeds, or minimum or maximum allowable speeds relative to normal, desired, steady state, etc. operation of the engine.

In certain embodiments, such as depicted in FIGS. 3-5, the core engine 16 includes one or more interdigitated structures at the compressor section 21 and/or the expansion section 33. In one embodiment, the expansion section 33 includes the second turbine 32 interdigitated with the first turbine 30, such as via a rotating outer shroud, drum, casing, or rotor. Although not depicted, it should be appreciated that embodiments of the expansion section 33 may include the first and/or second turbine 30, 32 interdigitated with one or more stages of the high-speed turbine 28. In another embodiment, the compressor section 21 includes the low-speed compressor 23 interdigitated with the high-speed compressor 24. For instance, the higher speed compressor, such as the high-speed compressor 24, may be a first compressor interdigitated with the lower speed compressor, such as the low-speed compressor 23.

Referring now to FIG. 1 and FIGS. 2-4, the core engine 16 includes the gear assembly 100 (FIGS. 2-4) configured to transfer power from the expansion section 33 and reduce an output rotational speed at the fan assembly 14 relative to one or both turbines 30, 32 (FIGS. 2-4). Embodiments of the gear assembly 100 depicted and described in regard to FIGS. 5-6 may allow for gear ratios suitable for large-diameter unducted fans and relatively small-diameter and/or relatively high-speed turbines, such as turbines 30, 32 (FIGS. 2-4). Additionally, embodiments of the gear assembly 100 provided herein may be suitable within the radial or diametrical constraints of the core engine 16 within the outer casing 18.

Embodiments of the gear assembly 100 depicted and described in regard to FIGS. 5-6 include gear ratios and arrangements that may providing provide for rotational speed of the fan assembly 14 corresponding to one or more ranges of cruise altitude and/or cruise speed provided above. Various embodiments of the gear assembly 100 provided herein may allow for gear ratios of up to 14:1. Still various embodiments of the gear assembly 100 provided herein may allow for gear ratios greater than 1:1. In certain embodiments, the gear ratio is at least 3:1. Still yet various embodiments of the gear assembly 100 provided herein allow for gear ratios between 3:1 to 12:1 for an epicyclic gear assembly or compound gear assembly. The second rotor speed provided herein may be proportionally greater than the first rotor speed corresponding to the gear ratio, e.g., the second rotor speed generally greater than the first rotor speed, or 3× greater, or 7× greater, or 9× greater, or 11× greater, or up to 14× greater, etc. than the first rotor speed. It should be appreciated that embodiments of the gear assembly 100 provided herein may allow for large gear ratios such as provided herein between the expansion section 33 and the fan assembly 14, or particularly between a first turbine 30 (FIGS. 2-4) and the fan assembly 14 and/or between a second turbine 32 (FIGS. 2-4) and the fan assembly 14, and within constraints such as, but not limited to, length (L) of the engine 10, maximum diameter ($D_{max}$) of the engine 10, cruise altitude of up to 65,000 ft, and/or operating cruise speed of up to Mach 0.85, or combinations thereof.

Although depicted as an un-shrouded or open rotor engine, it should be appreciated that aspects of the disclosure provided herein may be applied to shrouded or ducted engines, partially ducted engines, aft-fan engines, or other turbomachine configurations, including those for marine, industrial, or aero-propulsion systems. Certain aspects of the disclosure may be applicable to turbofan, turboprop, or turboshaft engines, such as turbofan, turboprop, or turboshaft engines with reduction gear assemblies. However, it should be appreciated that certain aspects of the disclosure may address issues that may be particular to un-shrouded or open rotor engines, such as, but not limited to, issues related to gear ratios, fan diameter, fan speed, length (L) of the engine 10, maximum diameter ($D_{max}$) of the engine 10, $L/D_{max}$ of the engine 10, desired cruise altitude, and/or desired operating cruise speed, or combinations thereof.

Referring now to FIGS. 5-6, schematic views of a rotor assembly 90 according to aspects of the present disclosure are provided. The rotor assembly 90 includes a first rotor assembly 101 interdigitated with a second rotor assembly 102. The first rotor assembly 101 and the second rotor assembly 102 are each operably coupled to a gear assembly 100. The first rotor assembly 101 is rotatable at a first rotor speed different from a second rotor speed at which the second rotor assembly 102 is rotatable. During normal operation, such as when the first rotor assembly 101 and the second rotor assembly 102 are operably coupled to the gear assembly 100 as combustion gases expand across the turbine section (FIG. 1), the first rotor speed is proportional to the second rotor speed via the gear assembly 100. A plurality of sensors 120 is configured to receive rotor state data relative to the first rotor assembly 101 or the second rotor assembly 102. The plurality of sensors 120 is configured to provide the rotor state data to a controller 210. The controller 210 is configured to execute operations, such as further described herein.

The plurality of sensors 120 receives rotor state data indicative of one or more of a speed, geometric dimension, or capacitance, or change thereof, or rate of change thereof, from the first rotor assembly 101 and the second rotor assembly 102. It should be appreciated that changes or rates of change generally include changes in magnitude over time, or changes over time in a rate of change. In certain embodiments, the rotor state data receives data indicative of an acceleration rate, an acceleration, or speed or velocity at the first rotor assembly 101, the second rotor assembly 102, or the fan assembly 14 (FIGS. 1-4). In certain embodiments, the plurality of sensors 120 includes speed sensors configured to receive rotor state data indicative of rotor speed, or changes thereof over time such as described above. In still certain embodiments, the plurality of sensors 120 includes capacitance sensors, or other sensors configured to determine a geometric dimension from the sensor to a rotor (e.g., the first rotor assembly 101 or the second rotor assembly 102). In various embodiments, the sensors 120 are positioned at a static structure adjacent or next to one or both of the first rotor assembly 101 and the second rotor assembly 102. In one embodiment, the sensors 120 include a first sensor 121 positioned at a static structure or frame 115 adjacent to the first rotor assembly 101 and configured to receive rotor state data from the first rotor assembly 101. In another embodiment, the sensors 102 include a second sensor 122 positioned at the static structure or frame 115 adjacent to the second rotor assembly 102 and configured to receive rotor state data from the second rotor assembly 102. In still another embodiment, the sensor 120 is positioned at the gear assembly 100 and configured to receive rotor state data relative to a bearing assembly 117, such as a bearing coupled to the first rotor assembly 101 and the second rotor assembly 102. In still another embodiment, the first sensor 121 and/or the second sensor 122 may be positioned at the gear assembly 100 to receive rotor state data at the respective first rotor assembly 101 and/or second rotor assembly 102. In still various embodiments, the sensors 120 include a fan sensor or third sensor 123 configured to receive rotor state data relative to the fan assembly 14 (FIG. 1).

The controller 210 is configured to receive rotor state data from the plurality of sensors 120 such as described above. The controller 210 compares rotor state data to one or more rotor state limits. In various embodiments, such as described herein, the rotor state limit is indicative of whether one or more of the first rotor assembly 101, the second rotor assembly 102, or the fan assembly 14 is disconnected, broken, or otherwise not connected to transmit power between the first rotor assembly 101 and the second rotor assembly 102 through the gear assembly 100 and the fan assembly 14.

In various embodiments such as described herein, the controller 210 is included with a computing system configured to store and/or execute operations for determining rotor failure, mitigating engine damage, and/or operating an engine with one or more failure conditions. In one embodiment, the controller 210 includes operations for receiving rotor state data from the plurality of sensors 120 positioned to receive rotor state data from the first rotor assembly 101 and the second rotor assembly 102. The controller 210 further includes operations for comparing rotor state data to one or more rotor state limits. The controller 210 may further include operations for determining whether one or more of the first rotor assembly 101, the second rotor assembly 102, or the fan assembly 14 is disconnected from the gear assembly 100 and generating a control signal if the rotor state data exceeds the rotor state limit.

In certain embodiments, the rotor state limit includes a first rotor maximum acceleration rate, a first rotor maximum acceleration, or a first rotor maximum speed relative to the first rotor assembly 101. Various embodiments of the controller 210 are configured to generate a control signal, such as a first control signal indicative of the first rotor assembly 101 being disconnected from the gear assembly 100, if the rotor state limit is exceeded.

In still certain embodiments, the rotor state limit includes a second rotor maximum acceleration rate, a second rotor maximum acceleration, or a second rotor maximum speed relative to the second rotor assembly 102. Still various embodiments of the controller 210 are configured to generate a control signal, such as a second control signal indicative of the second rotor assembly 102 being disconnected from the gear assembly 100, if the rotor state limit is exceeded.

In still yet certain embodiments, the controller 210 is configured to generate a control signal, such as a third control signal indicative of the fan assembly 14 being disconnected from the first rotor assembly 101 and the second rotor assembly 102, if a fan speed exceeds a speed ratio and a first rotor speed and a second rotor speed are proportional to one another.

The speed ratio of the first rotor speed at the first rotor assembly 101 and the second rotor speed at the second rotor assembly 102 is based at least on a gear ratio at the gear assembly 100. When the first rotor assembly 101 and the second rotor assembly 102 are coupled to the gear assembly 100, the rotor assemblies 101, 102, 14 are in fixed proportional speed arrangement based at least on the gear ratio at the gear assembly 100. Comparing rotor state data to one or more rotor state limits may include comparing the speed ratio to the first rotor speed or the second rotor speed. The rotor state data exceeds the rotor state limit if the first rotor speed or the second rotor speed exceeds the speed ratio, such as described herein.

In certain embodiments, the gear assembly 100 transmits power and torque from the first rotor assembly 101 to the fan assembly 14 via a sun gear 111 at the gear assembly 100. The second rotor assembly 102 is coupled to a ring gear 112 at the gear assembly 100. A planet gear assembly 113 is operably coupled to the sun gear 111 and the ring gear 112. In various embodiments, the planet gear assembly 113 includes one or more stages of planet gears or compound gears, static carriers, and gear meshes for transmitting power and torque from the rotor assembly 90. During normal operation of the turbomachine 10, the first rotor assembly 101 is generally configured to rotate at a greater speed (i.e., the first rotor speed) than the second rotor assembly 102 (i.e., the second rotor speed). The gear assembly 100 fixes the first rotor speed proportionally to the second rotor speed based on the gear ratio at the gear assembly.

During certain operating conditions or circumstances, one or more of the rotor assemblies 101, 102, 14 may be disconnected from gear assembly 100. Such disconnection may be undesired or unintended, such as due to shearing or destruction of a connecting rotor shaft, bearing failure, gear failure, uncommanded braking, or clutch failure. During operation of the turbomachine, expansion of combustion gases may continue to drive operation of the rotor assembly 90. However, one or more of the rotor assemblies 101, 102, 14 being disconnected from the gear assembly 100 may result in undesired rotor overspeed or rotor collusion (i.e., clashing or collusion between the first rotor assembly 101 and the second rotor assembly 102, and/or with an adjacent static structure 115 or gear assembly 100, or undesired translation of the bearing assembly 117). Rotor overspeed may result in rotor burst, blade liberation, or uncontained blade failure (e.g., undesired rotor projectiles).

In one instance, a failure at the first rotor assembly 101, such as generally depicted at area 131, may result in disconnection of the first rotor assembly 101 from a bearing, such as a thrust bearing 227 configured to limit, control, or offset axial movement of the first rotor assembly 101. The thrust bearing 227 may particularly be configured to counteract axial forces generated by the first rotor assembly 101 during turbomachine operation. As such, disconnection of the first rotor assembly 101 from the thrust bearing 227 may result in undesired axial movement of the first rotor assembly 101, such as to undesirably contact the second rotor assembly 102 and/or the adjacent static structure 115.

In another instance, a failure at the second rotor assembly 102, such as generally depicted at area 132, may result in disconnection of the second rotor assembly 102 from the gear assembly 100. In certain embodiments, the second rotor assembly 102 is disconnected from the ring gear 112 at the gear assembly 100. Disconnection of the second rotor assembly 102 from the gear assembly 100 may undesirably allow undesired axial movement of the second rotor assembly 102. Additionally, or alternatively, the second rotor assembly 102 disconnected from the gear assembly 100 resulting in loss of torque or power transfer to the fan assembly 14 may undesirably allow the second rotor assembly 102 to rotate freely and disproportionately relative to the first rotor assembly 101. Such free rotation may result in undesired overspeed conditions such as described herein.

In still another instance, a failure, such as generally depicted at area 133, at the fan assembly 14, or a shaft or coupling 104 extended from the gear assembly 100 to the fan assembly 14, may result in disconnection of the first rotor assembly 101 and the second rotor assembly 102 from transmitting power and torque to the fan assembly 14. The first and second rotor assemblies 101, 102 disconnected from the fan assembly 14 may result in undesired overspeed and/or axial movement such as described herein.

In still yet another instance, a failure at the first rotor assembly 101, such as generally depicted at area 134, may result in disconnection of the first rotor assembly 101 from the gear assembly 100. In such an embodiment, the failure at area 134 may correspond to a failure at an input shaft, sun gear, or corresponding mechanical input from the first rotor assembly 101 to or at the sun gear 111 at the gear assembly 100. Disconnection of the first rotor assembly 101 from the gear assembly 100 results in a loss of torque or power transfer to the fan assembly 14. Disconnection of the first rotor assembly 101 from the gear assembly 100 may undesirably allow the first rotor assembly 101 to rotate freely and disproportionately relative to the second rotor assembly 102. Such free rotation may result in undesired overspeed conditions such as described herein.

Various failures described herein may additionally, or alternatively, include undesired axial movement of one or more bearings, such as the thrust bearing 227, or a roller bearing 237, or other bearing. The bearing may undesirably wear, deteriorate, or become inoperable. The bearing, such as the thrust bearing 227, may clash with an adjacent structure, such as the gear assembly 100. Additionally, or alternatively, the first rotor assembly 101 or the second rotor assembly 102 may undesirably shift longitudinally of the such as to collide with the adjacent rotor assembly or static structure.

Failures such as described herein may not be detected or detectable during operation of known turbomachines, such as during generation of combustion gases and expansion thereof at the turbine section. For instance, known turbomachines may generally require shutdown and visual evaluation to determine which components have failed. Alternatively, failures such as described herein may enable further undesired damage to the turbomachine, such as due to rotor overspeed or rotor collusions.

Embodiments of the controller 210 provided herein include operations to determine a failure and operate the turbomachine 10 to mitigate further damage and to provide controlled and desirable operation of the turbomachine 10. In certain instances, the turbomachine 10, controller 210, operations or methods provided herein allow for continued or prolonged generation and expansion of combustion gases to generate thrust. Such prolonged operation may allow the turbomachine to continue at least partial thrust generation while mitigating risks associated with rotor overspeed and/or rotor collusion.

Various embodiments of the controller 210 include operations for generating a first control signal indicative of disconnection of the first rotor assembly 101 from the gear assembly 100 if the first rotor speed exceeds the speed ratio, such as described herein. In one embodiment, the first control signal may be generated when the first sensor 121 receives rotor state data indicating that rotor speed, or changes therein, is disproportionate to the second rotor speed based on the gear ratio. In certain embodiments, the operations include generating a first control signal indicative of disconnection of the first rotor assembly 101 from the gear assembly 100 if the first rotor speed exceeds the speed ratio and the second rotor speed and the fan speed are proportional to one another. In still certain embodiments, generating the first control signal occurs when the first rotor speed exceeds the speed ratio and the second rotor speed and the fan speed are equal.

Still various embodiments of the controller 210 include operations for generating a second control signal indicative of disconnection of the second rotor assembly 102 from the gear assembly 100 if the second rotor speed exceeds the speed ratio, such as described herein. In one embodiment, the second control signal may be generated when the second sensor 122 receives rotor state data indicating that rotor speed, or changes therein, is disproportionate to the first rotor speed based on the gear ratio. In certain embodiments, the operations include generating a second control signal indicative of disconnection of the second rotor assembly 102 from the gear assembly 100 if the second rotor speed exceeds the speed ratio and the first rotor speed and the fan speed are proportional to one another. Proportional first rotor speed and fan speed are generally defined at least in part by the gear ratios such as described herein.

Still another embodiment of the controller 210 includes operations for generating a third control signal indicative of disconnection of the fan assembly 14 from the first rotor assembly 101 and the second rotor assembly 102, such as described in regard to a failure at area 133, if the fan speed exceeds the speed ratio and the first rotor speed and the second rotor speed are proportional to one another, such as described herein.

In various embodiments, the controller 210 includes operations for reducing rotor speed of one or both of the first rotor assembly 101 and the second rotor assembly 102. In one embodiment, the operations for reducing rotor speed include reducing or eliminating flow of fuel to heat addition system 26, or otherwise reducing or eliminating production of combustion or expansion gases at the expansion section 33. In other embodiments, such as described further herein, reducing speed of one or both of the first rotor assembly 101 and the second rotor assembly 102 includes applying a brake to passively or actively reduce rotational speed at one or both rotor assemblies 101, 102. In still another embodiment, reducing speed of one or both of the first rotor assembly 101 and the second rotor assembly 102 includes reducing or eliminating fuel flow at the heat addition system 26 and applying a brake to reduce or eliminate rotational speed at the first rotor assembly 101 or the second rotor assembly 102. Various embodiments of the controller 210, operations, or method steps may provide overspeed protection based at least on the determined failure mode.

Referring now to FIGS. 7-8, an exemplary embodiment of a braking system 300 is provided. The braking system 300 may be applied to static-to-rotating interfaces at the rotor assembly 90, such as depicted at braking system 300A, 300B in FIGS. 5-6. The braking system 300 generally is configured to contact one or more of the first rotor assembly 101 or the second rotor assembly 102. In one embodiment, such as depicted at 300A, the braking system 300 is positioned at the static structure or frame 115 adjacent to the first rotor assembly 101. In another embodiment, such as depicted at 300B, the braking system 300 is positioned at a static component of the gear assembly 100. The braking system 300B is positioned adjacent to one or both of the second rotor assembly 102 or the first rotor assembly 101.

In various embodiments, the braking system 300 includes a brake plate 310 at which a brake pad 320 is positioned. The brake pad 320 includes a contact surface 320 positioned to selectively interface with rotor assembly 90. In certain embodiments, the braking system 300 includes an actuation fluid 330 at least partially surrounding a member 315 of the brake plate 310. The actuation fluid 330 is configured to selectively adjust a dimension between the contact surface 321 and the first rotor assembly 101 or the second rotor assembly 102. In various embodiments, the actuation fluid 330 includes a hydraulic fluid, a magnetorheological fluid, a fuel or fuel oil, a lubricant, a pneumatic fluid (e.g., air or inert gas), or other appropriate fluid.

In a particular embodiment, the actuation fluid 330 is contained within a passage or cavity 335 defined within the static structure or gear assembly. The cavity 335 may include a supply, scavenge, or damper fluid system of a bearing assembly or gear assembly. In one embodiment, referring to FIG. 7, the cavity 335 may be formed and configured at the static structure 115 to provide the actuation fluid for the braking system 300 and for one or more purposes for lubrication, buffering, clearance control, or vibration control at the bearing assembly 117. In another embodiment, referring to FIG. 8, the cavity 335 may be formed and configured at the gear assembly 100 to provide the actuation fluid for the braking system 300 and for one or more purposes for lubrication, buffering, clearance control, or vibration control at the gear assembly 100.

Various embodiments of the brake pad 310 may be formed of one or more metallic, semi-metallic, ceramic, or organic materials, or combinations thereof. Materials may include ceramic fibers, nonferrous fibers, graphite, copper, wool, steel, or other appropriate material. Certain embodiments may utilize materials that are particularly advantageous for high temperature environments, such as a turbine section of a gas turbine engine. In some embodiments, the brake pad may include a serrated or jagged surface and/or an adjacent corresponding serrated or jagged surface to provide a desired magnitude of friction at one or more of the first rotor assembly 101 and the second rotor assembly 102, such as described herein.

It should be appreciated that certain embodiments of the braking system 300 may be configured as a passive system. In one embodiment, the engine 10 includes the braking system 300 such as to provide a maximum displacement or stopping mechanism to prevent undesired collision or contact of the rotor assemblies 101, 102 with respect to one another, or with respect to one or more static structures 115 or gear assemblies 100 adjacent to the rotor assemblies 101, 102.

Referring now to FIGS. 1-8, the operations described herein may include contacting one or more of the first rotor assembly 101 or the second rotor assembly 102 to the contact surface 321 adjacent to the respective first rotor assembly 101 or the second rotor assembly 102 if the rotor state data exceeds the rotor state limit. The friction of the rotor assembly to the braking system 300 should allow the rotor state data corresponding to a rotational speed to decrease to acceptable limits. As such, in certain embodiments, the operations may include reducing rotor speed at one or more of the first rotor assembly 101 or the second rotor assembly 102. In still some embodiments, the braking system 300 may completely stop rotation of the respective rotor assembly 101, 102.

In certain embodiments, the decreased rotation or load from the rotor assembly 90 may improve or increase an axial spacing or dimension from the contact surface 321. As such, in various embodiments, contacting one or more of the first rotor assembly 101 or the second rotor assembly 102 to the contact surface 321 places rotor state data within the rotor state limit.

In various embodiments, contacting one or more of the first rotor assembly 101 or the second rotor assembly 102 to the contact surface 321 adjacent to the respective first rotor assembly or the second rotor assembly includes braking the first rotor assembly 101 when the first control signal is generated and braking the second rotor assembly 102 when the second control signal is generated. In certain embodiments, the controller 210 may actively control or manipulate the rotor state data by selectively contacting one or more of the first rotor assembly 101 or the second rotor assembly 102 to the contact surface 321 if the rotor state data exceeds the rotor state limit by adjusting the dimension between the contact surface 321 and the first rotor assembly 101 or the second rotor assembly 102 via the actuation fluid 330. As provided herein, adjusting the actuation fluid 330 may include adjusting a temperature, pressure, flow rate, or other mechanical property of the fluid, or an electrical current or voltage applied thereto (e.g., for a magnetorheological fluid), or other appropriate method for adjusting fluid properties.

Referring back to FIG. 1, in general, the engine 10 includes a computing system such as including the controller 210 configured to execute steps of the method or other operations provided herein. The controller 210 can correspond to any suitable processor-based device, including one or more computing devices. For instance, FIG. 1 illustrates one embodiment of suitable components that can be included within the controller 210. As shown in FIG. 1, the controller 210 can include a processor 212 and associated memory 214 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 214 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof. In various embodiments, the controller 210 may include one or more of a full authority digital engine controller (FADEC), an engine control unit (ECU), or an electronic engine control (EEC).

As shown, the controller 210 can include control logic 216 stored in memory 214. The control logic 216 may include instructions that when executed by the one or more processors 212 cause the one or more processors 212 to perform operations such as described above.

Additionally, as shown in FIG. 1, the controller 210 can also include a communications interface module 230. In several embodiments, the communications interface module 230 can include associated electronic circuitry that is used to send and receive data. As such, the communications interface module 230 of the controller 210 can be used to send and/or receive data to/from engine 10 and the compressor section 21. In addition, the communications interface module 230 can also be used to communicate with any other suitable components of the engine 10, including any number of motors, actuators, linkages, vane or blade pitch change mechanisms, sensors, braking system, actuatable fluids, or other actuatable structures.

It should be appreciated that the communications interface module 230 can be any combination of suitable wired and/or wireless communications interfaces and, thus, can be communicatively coupled to one or more components of the compressor section 21 or the engine 10 via a wired and/or wireless connection. As such, the controller 210 may receive, obtain, compare, determine, store, generate, transmit, or operate any one or more steps of the operations such as described herein, or an apparatus to which the engine 10 is attached. In certain embodiments, the controller 210 is located at the outer casing 18. In other embodiments, the controller 210 is located at a fan case or nacelle of a ducted engine. The controller 210 may additionally, or alternatively, be part of a distributed network. As such, the controller 210, all or in part, may be fixed to the engine, a vehicle to which the engine is attached (e.g., an aircraft, a rotorcraft, a projectile, etc.), a land-based system, a spaced-based system, or combinations thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A turbomachine comprising a first rotor assembly interdigitated with a second rotor assembly, wherein the first rotor assembly and the second rotor assembly are operably coupled to a gear assembly, and wherein the first rotor assembly is rotatable at a first rotor speed different from a second rotor speed at which the second rotor assembly is rotatable, the first rotor speed proportional to the second rotor speed via the gear assembly, and wherein a plurality of sensors is configured to receive rotor state data indicative of one or more of a speed, geometric dimension, or capacitance, or change thereof, or rate of change thereof, relative to the first rotor assembly or the second rotor assembly, and wherein the plurality of sensors is configured to provide the rotor state data to a controller, wherein the controller is configured to execute operations, the operations comprising; receiving rotor state data from the plurality of sensors; comparing rotor state data to one or more rotor state limits; and contacting one or more of the first rotor assembly or the second rotor assembly to a contact surface adjacent to the respective first rotor assembly or the second rotor assembly if the rotor state data exceeds the rotor state limit, wherein contacting one or more of the first rotor assembly or the second rotor assembly to the contact surface places rotor state data within the rotor state limit.

2. The turbomachine of any clause herein, wherein the rotor state limit comprises a first rotor maximum acceleration rate, a first rotor maximum acceleration, or a first rotor maximum speed.

3. The turbomachine of any clause herein, wherein the rotor state limit comprises a second rotor maximum acceleration rate, a second rotor maximum acceleration, or a second rotor maximum speed.

4. The turbomachine of any clause herein, wherein the wherein the rotor state limit comprises a speed ratio of the first rotor speed and the second rotor speed, wherein the speed ratio is based on a gear ratio at the gear assembly.

5. The turbomachine of any clause herein, wherein comparing rotor state data to one or more rotor state limits comprises comparing the speed ratio to the first rotor speed or the second rotor speed, and wherein the rotor state data exceeds the rotor state limit if the first rotor speed or the second rotor speed exceeds the speed ratio.

6. The turbomachine of any clause herein, the operations comprising generating a first control signal indicative of first rotor assembly disconnection from the gear assembly if the first rotor speed exceeds the speed ratio; and generating a second control signal indicative of second rotor assembly disconnection from the gear assembly if the second rotor speed exceeds the speed ratio.

7. The turbomachine of any clause herein, the turbomachine comprising a fan assembly operatively coupled to the gear assembly; and a fan speed sensor configured to receive rotor state data indicative of a fan speed.

8. The turbomachine of any clause herein, the operations comprising generating a first control signal indicative of first rotor assembly disconnection from the gear assembly if the first rotor speed exceeds the speed ratio and the second rotor speed and the fan speed are proportional to one another; and generating a second control signal indicative of second rotor assembly disconnection from the gear assembly if the second rotor speed exceeds the speed ratio and the first rotor speed and the fan speed are proportional to one another.

9. The turbomachine of any clause herein, wherein contacting one or more of the first rotor assembly or the second rotor assembly to the contact surface adjacent to the respective first rotor assembly or the second rotor assembly comprises braking the first rotor assembly when the first control signal is generated; and braking the second rotor assembly when the second control signal is generated.

10. The turbomachine of any clause herein, the operations comprising generating a third control signal indicative of fan assembly disconnection from the first rotor assembly and the second rotor assembly if the fan speed exceeds the speed ratio and the first rotor speed and the second rotor speed are proportional to one another.

11. The turbomachine of any clause herein, wherein the rotor state limit comprises a minimum geometric dimension or capacitance between a static structure positioned next to the first rotor assembly; the gear assembly next to a bearing operably coupled to the first rotor assembly and the second rotor assembly; or the first rotor assembly and the second rotor assembly.

12. The turbomachine of any clause herein, the turbomachine comprising a braking system configured to contact one or more of the first rotor assembly or the second rotor assembly, wherein the braking system comprises a brake plate at which a brake pad comprising a contact surface is positioned.

13. The turbomachine of any clause herein, wherein the braking system comprises an actuation fluid at least partially surrounding a member of the brake plate, wherein the actuation fluid is configured to adjust a dimension between the contact surface and the first rotor assembly or the second rotor assembly.

14. The turbomachine of any clause herein, wherein the braking system is positioned at a static structure or the gear assembly.

15. The turbomachine of any clause herein, wherein contacting one or more of the first rotor assembly or the second rotor assembly to the contact surface if the rotor state data exceeds the rotor state limit comprises adjusting, via the actuation fluid, the dimension between the contact surface and the first rotor assembly or the second rotor assembly.

16. The turbomachine of any clause herein, the operations comprising reducing rotor speed of one or both of the first rotor assembly and the second rotor assembly comprising reducing or eliminating fuel flow if the rotor state data exceeds the rotor state limit.

17. A computing system for a turbomachine, wherein a first rotor assembly is interdigitated with a second rotor assembly, and wherein the first rotor assembly and the second rotor assembly are operably coupled to a gear assembly, and wherein a fan assembly is operably coupled to receive power from the gear assembly, wherein the computing system is configured to execute operations, the operations comprising: receiving rotor state data from a plurality of sensors positioned to receive rotor state data from the first rotor assembly and the second rotor assembly; comparing rotor state data to one or more rotor state limits; determining whether one or more of the first rotor assembly, the second rotor assembly, or the fan assembly is disconnected from the gear assembly; and generating a control signal if the rotor state data exceeds the rotor state limit.

18. The computing system of any clause herein, wherein generating a control signal comprises generating the control signal indicative of the first rotor assembly disconnected from the gear assembly if the rotor state limit comprising a first rotor maximum acceleration rate, a first rotor maximum acceleration, or a first rotor maximum speed is exceeded.

19. The computing system of any clause herein, wherein generating a control signal comprises generating the control signal indicative of the second rotor assembly disconnected from the gear assembly if the rotor state limit comprising a second rotor maximum acceleration rate, a second rotor maximum acceleration, or a second rotor maximum speed is exceeded.

20. The computing system of any clause herein, wherein generating a control signal comprises generating the control signal indicative of fan assembly disconnection from the first rotor assembly and the second rotor assembly if the fan speed exceeds a speed ratio and a first rotor speed and a second rotor speed are proportional to one another.

21. The computing system of any clause herein, the operations comprising reducing rotor speed at one or more of the first rotor assembly or the second rotor assembly, wherein reducing rotor speed places rotor state data within the rotor state limit.

22. The computing system of any clause herein for the turbomachine of any clause herein.

23. The turbomachine of any clause herein comprising the computing system of any clause herein.

24. A method for overspeed protection for a turbomachine including a first rotor assembly interdigitated with a second rotor assembly operably coupled together to a gear assembly, wherein the first rotor assembly is rotatable at a first rotor speed different from a second rotor speed at which the second rotor assembly is rotatable, the first rotor speed proportional to the second rotor speed via the gear assembly, and wherein a plurality of sensors is configured to receive rotor state data indicative of one or more of a speed, geometric dimension, or capacitance, or change thereof, or rate of change thereof, relative to the first rotor assembly or the second rotor assembly, and wherein the plurality of sensors is configured to provide the rotor state data to a controller configured to execute operations, wherein the method comprises receiving rotor state data from the plurality of sensors; comparing rotor state data to one or more rotor state limits; and contacting one or more of the first rotor assembly or the second rotor assembly to a contact surface adjacent to the respective first rotor assembly or the second rotor assembly if the rotor state data exceeds the rotor state limit, wherein contacting one or more of the first rotor assembly or the second rotor assembly to the contact surface places rotor state data within the rotor state limit.

25. A method for operating a turbomachine including a first rotor assembly interdigitated with a second rotor assembly, wherein the first rotor assembly and the second rotor assembly are operably coupled to a gear assembly, and wherein a fan assembly is operably coupled to receive power from the gear assembly, the method comprising receiving rotor state data from a plurality of sensors positioned to receive rotor state data from the first rotor assembly and the second rotor assembly; comparing rotor state data to one or more rotor state limits; determining whether one or more of the first rotor assembly, the second rotor assembly, or the fan assembly is disconnected from the gear assembly; and generating a control signal if the rotor state data exceeds the rotor state limit.

26. The method of any clause herein, wherein the rotor state limit comprises a first rotor maximum acceleration rate, a first rotor maximum acceleration, or a first rotor maximum speed.

27. The method of any clause herein, wherein the rotor state limit comprises a second rotor maximum acceleration rate, a second rotor maximum acceleration, or a second rotor maximum speed.

28. The method of any clause herein, wherein the wherein the rotor state limit comprises a speed ratio of the first rotor speed and the second rotor speed, wherein the speed ratio is based on a gear ratio at the gear assembly.

29. The method of any clause herein, wherein comparing rotor state data to one or more rotor state limits comprises comparing the speed ratio to the first rotor speed or the second rotor speed, and wherein the rotor state data exceeds the rotor state limit if the first rotor speed or the second rotor speed exceeds the speed ratio.

30. The method of any clause herein, the operations comprising generating a first control signal indicative of first rotor assembly disconnection from the gear assembly if the first rotor speed exceeds the speed ratio; and generating a second control signal indicative of second rotor assembly disconnection from the gear assembly if the second rotor speed exceeds the speed ratio.

31. The method of any clause herein, the method comprising generating a first control signal indicative of first rotor assembly disconnection from the gear assembly if the first rotor speed exceeds the speed ratio and the second rotor speed and the fan speed are proportional to one another; and generating a second control signal indicative of second rotor assembly disconnection from the gear assembly if the second rotor speed exceeds the speed ratio and the first rotor speed and the fan speed are proportional to one another.

32. The method of any clause herein, wherein contacting one or more of the first rotor assembly or the second rotor assembly to the contact surface adjacent to the respective first rotor assembly or the second rotor assembly comprises braking the first rotor assembly when the first control signal is generated; and braking the second rotor assembly when the second control signal is generated.

33. The method of any clause herein, the method comprising generating a third control signal indicative of fan assembly disconnection from the first rotor assembly and the second rotor assembly if the fan speed exceeds the speed ratio and the first rotor speed and the second rotor speed are proportional to one another.

34. The method of any clause herein, wherein the rotor state limit comprises a minimum geometric dimension or capacitance between a static structure positioned next to the first rotor assembly; the gear assembly next to a bearing operably coupled to the first rotor assembly and the second rotor assembly; or the first rotor assembly and the second rotor assembly.

35. The method of any clause herein, wherein contacting one or more of the first rotor assembly or the second rotor assembly to the contact surface if the rotor state data exceeds the rotor state limit comprises adjusting, via the actuation fluid, the dimension between the contact surface and the first rotor assembly or the second rotor assembly.

36. The method of any clause herein, the method comprising reducing rotor speed of one or both of the first rotor assembly and the second rotor assembly comprising reducing or eliminating fuel flow if the rotor state data exceeds the rotor state limit.

37. The method of any clause herein, wherein generating a control signal comprises generating the control signal indicative of the first rotor assembly disconnected from the gear assembly if the rotor state limit comprising a first rotor maximum acceleration rate, a first rotor maximum acceleration, or a first rotor maximum speed is exceeded.

38. The method of any clause herein, wherein generating a control signal comprises generating the control signal indicative of the second rotor assembly disconnected from the gear assembly if the rotor state limit comprising a second rotor maximum acceleration rate, a second rotor maximum acceleration, or a second rotor maximum speed is exceeded.

39. The method of any clause herein, wherein generating a control signal comprises generating the control signal indicative of fan assembly disconnection from the first rotor assembly and the second rotor assembly if the fan speed exceeds a speed ratio and a first rotor speed and a second rotor speed are proportional to one another.

40. The method of any clause herein, the method comprising reducing rotor speed at one or more of the first rotor assembly or the second rotor assembly, wherein reducing rotor speed places rotor state data within the rotor state limit.

41. The turbomachine of any clause herein, the turbomachine configured to execute the method of any clause herein.

42. The computing system of any clause herein, the computing system configured to execute the method of any clause herein.

43. A turbomachine, the turbomachine comprising first rotor assembly interdigitated with a second rotor assembly, wherein the first rotor assembly and the second rotor assembly are together coupled to a gear assembly; and a braking system configured to contact one or more of the first rotor assembly or the second rotor assembly, wherein the braking system comprises a brake plate at which a brake pad comprising a contact surface is positioned.

What is claimed is:

1. A computing system for a turbomachine, wherein a first rotor assembly is interdigitated with a second rotor assembly, and wherein the first rotor assembly and the second rotor assembly are operably coupled to a gear assembly, and wherein a fan assembly is operably coupled to receive power from the gear assembly, wherein the computing system is configured to execute operations, the operations comprising:
   receiving rotor state data from a plurality of sensors positioned to receive the rotor state data from the first rotor assembly and the second rotor assembly;
   comparing the rotor state data to one or more rotor state limits, wherein the one or more rotor state limits comprises a speed ratio of a first rotor speed and a second rotor speed, wherein the speed ratio is based on a gear ratio at the gear assembly:
   determining whether one or more of the first rotor assembly, the second rotor assembly, or the fan assembly is disconnected from the gear assembly;
   generating a control signal if the rotor state data exceeds at least one of the one or more rotor state limits; and
   generating a first control signal indicative of first rotor assembly disconnection from the gear assembly if the first rotor speed exceeds the speed ratio and the second rotor speed and a fan speed are proportional to one another; and generating a second control signal indicative of second rotor assembly disconnection from the gear assembly if the second rotor speed exceeds the speed ratio and the first rotor speed and the fan speed are proportional to one another.

2. The computing system of claim 1, wherein comparing the rotor state data to the one or more rotor state limits comprises comparing the speed ratio to the first rotor speed or the second rotor speed, and wherein the rotor state data exceeds the one or more rotor state limits if the first rotor speed or the second rotor speed exceeds the speed ratio.

3. The computing system of claim 2, the operations comprising:
   generating a first control signal indicative of first rotor assembly disconnection from the gear assembly if the first rotor speed exceeds the speed ratio; and
   generating a second control signal indicative of second rotor assembly disconnection from the gear assembly if the second rotor speed exceeds the speed ratio.

4. The computing system of claim 1, the operations comprising:
   generating a brake control signal to contact one or more of the first rotor assembly or the second rotor assembly to a contact surface adjacent to the respective first rotor assembly or the second rotor assembly.

5. The computing system of claim 1, the operations comprising:
   generating a third control signal indicative of fan assembly disconnection from the first rotor assembly and the second rotor assembly if the fan speed exceeds the speed ratio and the first rotor speed and the second rotor speed are proportional to one another.

6. The computing system of claim 1, wherein generating the control signal comprises generating the control signal indicative of the first rotor assembly disconnected from the gear assembly if the one or more rotor state limits is exceeded, wherein the one or more rotor state limits comprises a first rotor maximum acceleration rate, a first rotor maximum acceleration, or a first rotor maximum speed.

7. The computing system of claim 1, wherein generating the control signal comprises generating the control signal indicative of the second rotor assembly disconnected from the gear assembly if the one or more rotor state limits is exceeded, wherein the one or more rotor state limits comprises a second rotor maximum acceleration rate, a second rotor maximum acceleration, or a second rotor maximum speed.

8. The computing system of claim 1, wherein generating the control signal comprises generating the control signal indicative of fan assembly disconnection from the first rotor assembly and the second rotor assembly if a fan speed exceeds a speed ratio and a first rotor speed and a second rotor speed are proportional to one another.

9. The computing system of claim 1, wherein generating the control signal comprises generating the control signal to reduce rotor speed of one or both of the first rotor assembly and the second rotor assembly by reducing or eliminating fuel flow if the rotor state data exceeds the one or more rotor state limits.